J. M. WHALBE.

ELEVATOR.

Reissued Sept. 18, 1917.

14,363.

APPLICATION FILED AUG. 17, 1917.

2 SHEETS—SHEET 1.

Witnesses:

C. S. Ashley

Edward Durant

Inventor

Jacob M. Whalbe

By his Attorney F. W. Barker

J. M. WHALBE.

ELEVATOR.

Reissued Sept. 18, 1917.

14,363.

APPLICATION FILED AUG. 17, 1917.

2 SHEETS—SHEET 2.

Witnesses:

C. S. Ashley

Edward Durant

Inventor

Jacob M. Whalbe

By his Attorney F. W. Barker

UNITED STATES PATENT OFFICE.

JACOB M. WHALBE, OF NEW YORK, N. Y.

ELEVATOR.

14,363. Specification of Reissued Letters Patent. Reissued Sept. 18, 1917.

Original No. 1,232,742, dated July 10, 1917, Serial No. 18,881, filed April 3, 1915. Application for reissue filed August 17, 1917. Serial No. 187,022.

*To all whom it may concern:*

Be it known that I, JACOB M. WHALBE, a citizen of the United States, and resident of the borough of Manhattan, in the city, county, and State of New York, have invented certain new and useful Improvements in Elevators, of which the following is a specification.

This invention relates to elevators, and is directed particularly to means for locking the control for elevators, operating in conjunction with the door opening means, whereby an elevator cannot be started in movement away from its place of rest at the floor of a building until the door has first been completely closed. This is for the purpose of mechanically compelling the operator to positively close the door before starting the car, an act which in practice is frequently neglected, sometimes with disastrous consequences to persons using the elevator.

My improvement in brief comprises a control locking and unlocking device which becomes effective through the act of opening the elevator door which communicates with the building floor, and which holds said control inactive until the door has again been completely closed. The instrumentalities employed in accomplishing this purpose comprise an oscillating sheave having a cable connection with the control mechanism, and a slideway upon said sheave to receive a sliding lock, which enters the slideway only when the door is opened, and which, when so entered, prevents the sheave from oscillating, thereby holding the control inactive. The sliding lock itself is automatically actuated through means operating in the opening movement of the elevator door, which means however are only capable of performing their function when the control lever has been fully swung over to bring the car to a standstill, because the sheave, until that act has been performed, does not present its slideway into proper alinement with the locking slide for the reception of the latter. When the car has been brought to rest, and the door opened and locked in the open position, it then becomes necessary to enable the operator to again start the car either upward or downward, to first release the sliding lock from its engagement with the control sheave, which means that the door must first be closed, to thereby permit the automatic mechanism between the door and the sliding lock to be put in motion, to cause the withdrawal of said sliding lock from such engagement.

The mechanical means whereby the said functions are served, also some modifications thereof, also other features of my invention are hereinafter described and illustrated in the drawings forming a part hereof.

In the drawings:—

Figure 1:
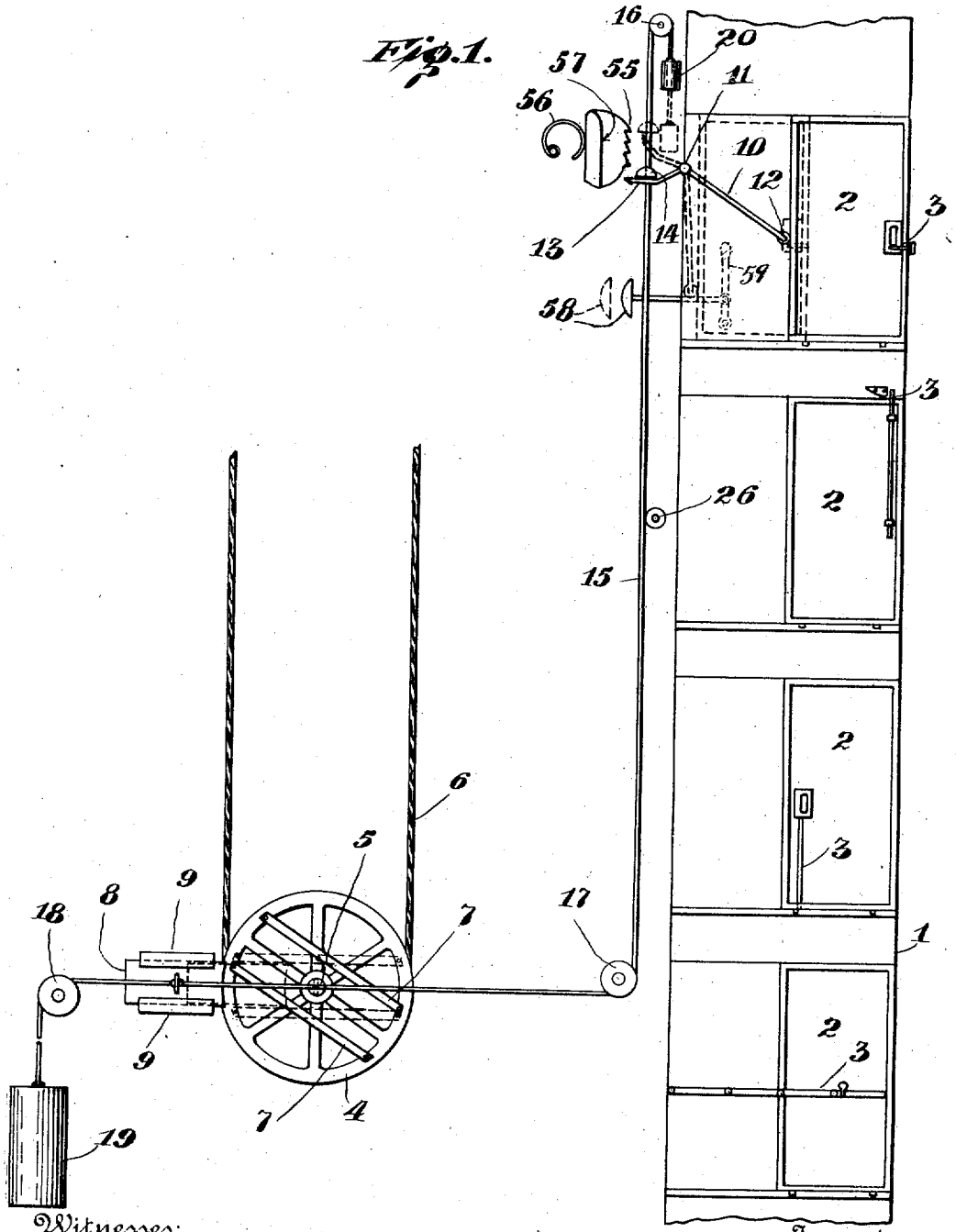
Figure 1 is a diagrammatic elevation of an elevator shaft, with sliding doors for the several floors of a building; and with the lock and lock actuating mechanism in one form thereof.

Reference being had first to the form of my invention shown in Fig. 1, the numeral 1 indicates an elevator shaft provided with the sliding doors 2, which each may have the usual latching devices 3 of different characters, these being too well known to need description.

Suitably arranged and disposed with relation to the shaft 1 is a sheave 4, pivoted at 5 in a fixed position, and adapted to be connected, by opposite ends of a cable 6, with a control lever or mechanism actuated thereby (not shown), whereby the sheave will be rocked or oscillated oppositely according to the direction of movement of the lever in starting and stopping the car. The sheave 4 carries on one face thereof a slideway which may be composed of the parallel guide bars 7, extending, spaced apart, across the diameter of said sheave, said slideway being adapted, when the sheave is turned to bring said slideway as to a horizontal position, to receive a lock 8 which is slidable in parallel, fixed guides 9, said lock moving to its operative position in which part thereof remains within the guides 9, and part is entered between the guide bars 7, in which position the sheave will be held against movement, and the control thereby locked.

In the example shown the sheave is shown as turned with its guide bars 7 at an angle to the horizontal plane, or out of alinement with the lock, thereby indicating that the control lever is thrown for the ascent or descent of the car, in which position of said lever and sheave, as stated, the doors cannot be opened. The upper door 2 is shown as provided with a lever 10, fulcrumed at 11, and having a roller 12 at one end which bears against the rear edge of the door, so that, in the sliding movement of the door in opening, the other end 13 of the lever is swung upwardly to the dotted position indicated, carrying with it an engaging device 14 which is fast upon a cord or strand 15, whereby said cord or strand is shifted in the position which it occupies about the supporting and guiding pulleys 16, 17 and 18. The cord or strand 15 is held taut as by a weight 19, which also serves, by gravity, to restore it to normal position when the door is closed, and a counter weight or balance 20 is provided at the other end of said cord or strand.

From the foregoing it will be observed that while the car is in motion, the control sheave 4 then presenting its guide bars 7 at an angle to the path of travel of the lock 8, it is not possible for the door to be opened, because, in an attempt to slide the door open, the end of the lock will abut against the end of one of said guide bars, and abortive strain only will be imparted to the cord or strand 15. But, when the control lever has been thrown to bring the slideway between guide bars 7 exactly in alinement with lock 8, to receive said lock, which will occur in the act of the control lever serving to bring the car to a standstill, the lock 8 will then freely enter said slideway as the door is being opened. This operation will also lock the sheave against oscillation, and hence will lock the control lever against actuation, so that the car cannot be started into movement again while the door remains open. Obviously however the action of closing the door releases the cord or strand 15 from engagement by lever end 14, whereupon the weight 19 withdraws lock 8 from its engagement with the slideway in the sheave 4, thereby releasing said sheave and permitting the control lever to be operated to start the car in motion.

Figure 2:
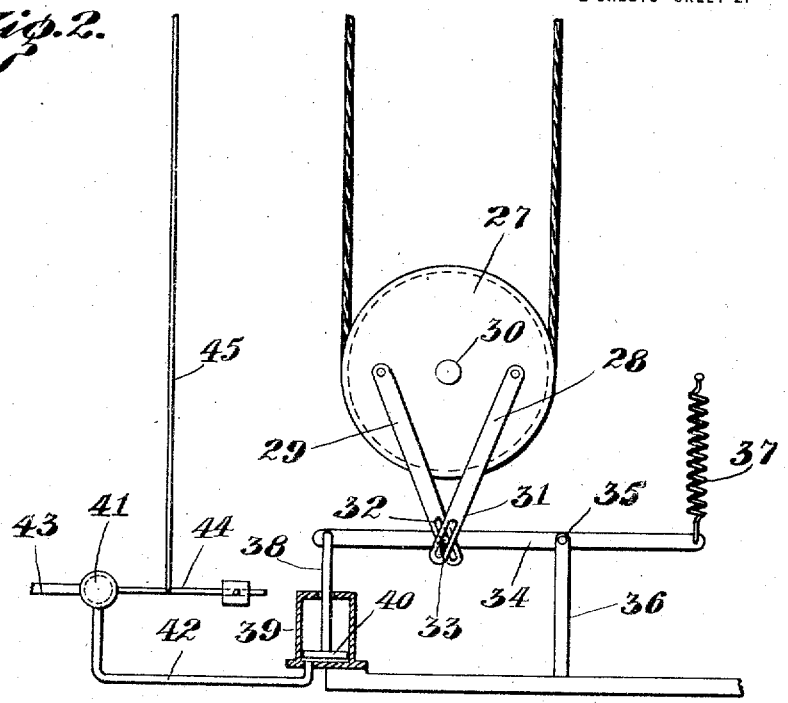
Fig. 2 is a view of a modified form of lock mechanism employing hydraulic power.

As a modification of the sheave and control locking means, where hydraulic power is employed, an oscillating sheave 27, (Fig. 2), is provided with arms 28, 29, pivoted thereto at opposite sides of the sheave shaft 30, said arms extending downwardly, and having slots 31, 32, respectively near their lower ends, with an intersecting stud 33, engaged in a lever 34 that is pivoted at 35 in a support as 36. The sheave 27 is capable of oscillating within the limits of movement allowed the slots 31, 32, over stud 33, said movements representing the respective movements of the control lever in starting and stopping the car. A spring 37 serves to hold lever 34 and the sheave in position with the control lever thrown for the movement of the car and the door consequently closed. A plunger 38, depending from the other end of the lever 34, is entered within a cylinder 39, and has a piston 40, normally depressed therein. Said cylinder has a port in its lower portion, in communication, with a two way valve 41, through a pipe 42, said valve communicating, as by pipe 43, with a source of pressure supply, not shown, and having a weighted actuating lever 44, with which is connected a cord or strand 45, that corresponds with the cord or strand 15. In the operation of this device, the act of drawing upwardly upon the cord or strand 45, as in the act of opening the door, serves to actuate the valve to admit pressure to the cylinder 39, thereby forcing the piston 40 upwardly, thereby locking the sheave in the position to which it has been turned by the operation of the control device.

Figure 3:
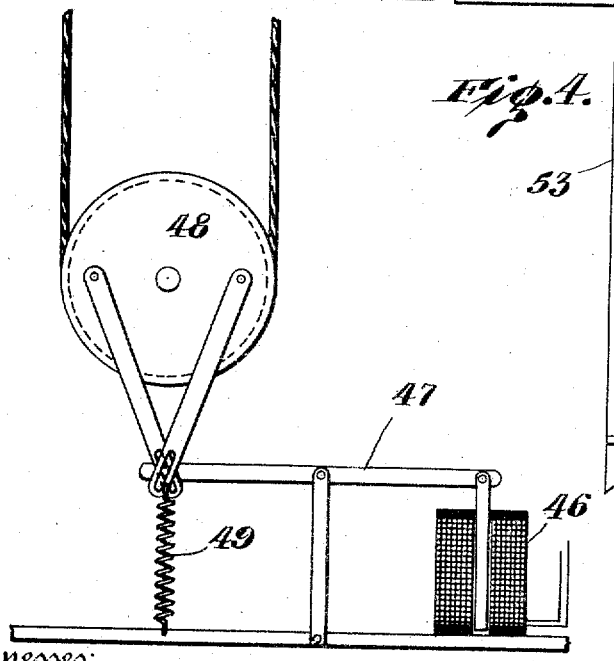
Fig. 3 is a view of another modification which is electrically operated.

In the further modification of Fig. 3, where the lock is shown to be electrically operated, a solenoid magnet 46 may have its circuit closed as by the act of opening the door, whereby, through lever 47, the sheave 48 may be locked to prevent actuation of the lever control in starting the car, and said circuit may be opened in the act of closing the door, whereby the spring 49 may operate to lock said sheave oppositely when turned in the act of starting the car in motion.

Figure 4:
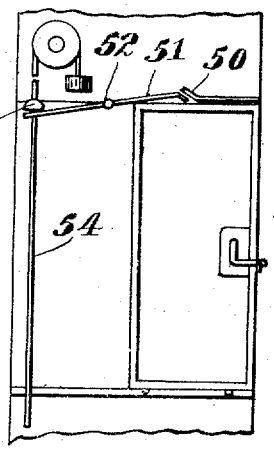
Fig. 4 is a detail of a modified form of sliding lock actuator.

In Fig. 4 further means are shown whereby the sliding door, in opening, actuates the cord or strand which controls the lock means of Fig. 1. Said means comprises an upwardly inclined member 50 at the upper end of the door, in position to meet and depress one end of a lever 51, pivoted at 52, and engaging with a projection 53 on a cord or strand 54, whereby said cord or strand is operated in the manner previously set forth, for the same purpose.

Means of positively locking elevator doors for release either automatically or manually may also be provided, as follows, in connection with the lever device 10 shown in Fig. 1. These means comprise a rack 55 held in a fixed position in the shaft relatively to the door with which used, for engagement by the arm 13 of said lever, but said rack being movable rearwardly against the pressure of a spring 56 which holds it in its normal operative position. As the door closes the arm 13 moves downwardly over the teeth of said rack, and engages therewith to normally prevent the door from sliding open. Said rack has a shoulder portion 57 which is adapted to be engaged by a cam 58 on the car, to press said rack out of its operative position, against spring 56, as the car arrives at its position with its floor on a level with the building floor, to thus permit the door to be opened. Said cam 58 is normally retracted as shown in full lines, Fig. 1. But when required to be in operative position, it is extended to the position shown in dotted lines, where it is in the path of the shoulder 57. The means employed for actuating said cam 58 may be of suitable character. I have shown a lever 59, connected to the stem of said cam 58, and mounted within the car, to be under the control of the operator.

Variations may be resorted to within the spirit and scope of my invention, and parts thereof used without others.

I claim:—

1. A safety device for elevator doors comprising a sheave, means between said sheave and the car control to oscillate said sheave oppositely in the respective stopping and starting operations of said control, a sliding lock, means upon said sheave receptive of said lock when the control has been operated to stop the car, means upon said sheave to prevent engagement of said lock therewith when the control has been operated to start the car, an actuator for said lock, means between said door and actuator, operating under the influence of the door movement in opening, whereby said lock is drawn into engagement with said sheave, and gravity means to disengage said lock upon closing the door.

2. A safety device for elevator doors, a car control, an oscillating member, means connecting said control and member for movement in unison, a sliding lock to engage said member to lock it and the control, a weighted connector to disengage said sliding lock, a sliding door, and a pivotal lever engaging both said connector and door; whereby, in the opening movement of said door, said connector is caused to directly draw said lock into engagement with said member, to thereby lock said control.

3. The combination with an elevator, having a control and a sliding door, of a lock for said control, an actuator for said lock, a lever engaging said actuator and movable with the movement of said sliding door, and a rack to engage said lever; together with release means operable from within the elevator to disengage said rack from said lever.

4. In a safety device for elevator doors, the combination of a sheave having a transverse slideway, means between said sheave and the car control to oscillate said sheave oppositely in the respective stopping and starting operations of said control, a sliding lock, a slideway support therefor, said sheave slideway and lock alining for engagement when the control has been operated to stop the car, a connector to control said lock, guide pulleys for said connector to direct its tension through the longitudinal axis of the lock, means operated by the door in opening to actuate said connector and lock, and gravity means to disengage said lock upon closing the door.

Signed at the borough of Manhattan, in the city, county and State of New York, this 31st day of March, A. D. 1915.

JACOB M. WHALBE.

Witnesses:
F. W. WARKER,
EDWARD DURANT.

Copies of this patent may be obtained for five cents each, by addressing the "Commissioner of Patents, Washington, D. C."